United States Patent [19]
Crosby et al.

[11] Patent Number: 5,999,212
[45] Date of Patent: Dec. 7, 1999

[54] METHOD AND APPARATUS FOR INFRARED DETECTION OF A MOVING TARGET IN THE PRESENCE OF SOLAR CLUTTER

[75] Inventors: Holmes Crosby, Rockville, Md.; Michael J. Wardlaw, King George, Va.

[73] Assignee: The United States of America as represented by the Secretary of the Navy, Washington, D.C.

[21] Appl. No.: 08/903,250

[22] Filed: Jul. 31, 1997

[51] Int. Cl.⁶ .......................... H04N 5/33; H04N 5/225; H04N 9/64
[52] U.S. Cl. .......................... 348/164; 348/169; 348/33; 250/338.1; 250/341.8; 342/53
[58] Field of Search ................... 348/164, 31, 33, 348/169; 250/338.1, 339.62, 339.11, 341.8, 495.1, 504 R; 342/52, 53; H04N 5/33, 5/225, 9/64

[56] References Cited

U.S. PATENT DOCUMENTS

| | | | |
|---|---|---|---|
| 3,943,561 | 3/1976 | Biddlecomb | 358/81 |
| 4,189,747 | 2/1980 | Funari | 358/126 |
| 4,290,043 | 9/1981 | Kaplan | 250/342 |
| 4,518,254 | 5/1985 | Penny et al. | 356/5.08 |
| 4,958,077 | 9/1990 | Menke | 250/347 |
| 5,130,795 | 7/1992 | Rusche et al. | 358/108 |
| 5,355,588 | 10/1994 | Lew et al. | 342/104 |
| 5,570,094 | 10/1996 | Armstrong | 342/107 |
| 5,574,498 | 11/1996 | Sakamoto et al. | 348/169 |
| 5,808,734 | 9/1998 | Kolari | 250/341.8 |

*Primary Examiner*—Tommy P. Chin
*Assistant Examiner*—Nhon T. Diep
*Attorney, Agent, or Firm*—James B. Bechtel, Esq.

[57] ABSTRACT

A detection system for detecting a target flying over water, which includes a detector positioned to receive radiation reflected by the target off the water, and producing a detector output signal having an amplitude proportional to the amount of received radiation, a high-pass filter for passing portions of the detector output signal having a frequency greater than a prescribed threshold frequency, and for blocking portions of the detector output signal having a frequency lower than the prescribed threshold frequency. The prescribed threshold frequency is sufficiently high to ensure that only the portions of the detector output signal produced by the radiation reflected by the target off the water are passed by the high-pass filter, and that portions of the detector output signal produced by solar glitter are not passed. In a specific embodiment, the system is designed to be installed on a ship for the purpose of detecting low-flying, fast-moving targets, such as cruise missiles.

20 Claims, 15 Drawing Sheets

5,999,212

METHOD AND APPARATUS FOR INFRARED DETECTION OF A MOVING TARGET IN THE PRESENCE OF SOLAR CLUTTER

BACKGROUND OF THE INVENTION

The present invention relates generally to infrared target detection systems, and more particularly, to a novel method and apparatus for indirectly detecting a low-flying, fast moving target by utilizing an infrared detector to detect the radiant energy reflected by the target off of the rough ocean surface, despite the presence of solar clutter on the ocean.

Presently available infrared target detection systems for detecting the presence of a low-flying, fast-moving target (e.g., a cruise missile or an enemy aircraft) over the ocean rely upon direct detection of the target, which means that the power of the radiant energy within the field of view of the detection system increases monotonically as the target moves directly towards the infrared sensor array of the detection system. Such presently available infrared target detection systems have difficulty in discriminating the target from the solar energy reflected off of the water (i.e., the solar clutter or solar glitter), thereby necessitating the use of complex signal analysis algorithms and/or higher-resolution sensors. However, even with such expensive measures, the existing infrared target detection systems do not have sufficiently rapid response times and/or are not sufficiently reliable for certain applications, e.g., for detection of surface-skimming cruise missiles in the presence of solar clutter.

Based on the above, it can be appreciated that there presently exists a need in the art for an infrared detection system which is capable of accurately and reliably detecting low-flying, fast-moving targets over the ocean, in the presence of solar glitter. The present invention fulfills this need in the art.

SUMMARY OF THE INVENTION

The present invention encompasses a detection system for detecting a target flying over water, which includes a detector positioned to receive radiation reflected by the target off the water, and producing a detector output signal having an amplitude proportional to the amount of received radiation, a high-pass filter for passing portions of the detector output signal having a frequency greater than a prescribed threshold frequency, and for blocking portions of the detector output signal having a frequency lower than the prescribed threshold frequency. The prescribed threshold frequency is sufficiently high to ensure that only the portions of the detector output signal produced by the radiation reflected by the target off the water are passed by the high-pass filter, and that portions of the detector output signal produced by solar glitter are not passed. In a specific embodiment, the system is designed to be installed on a ship for the purpose of detecting low-flying, fast-moving targets, such as cruise missiles.

The present invention also encompasses a corresponding method for detecting a target flying over water.

BRIEF DESCRIPTION OF THE DRAWINGS

The above and other objects, features, and advantages of the present invention will become apparent from the following detailed description taken in conjunction with the accompanying drawings, in which.

DETAILED DESCRIPTION OF THE INVENTION

Figure 1:
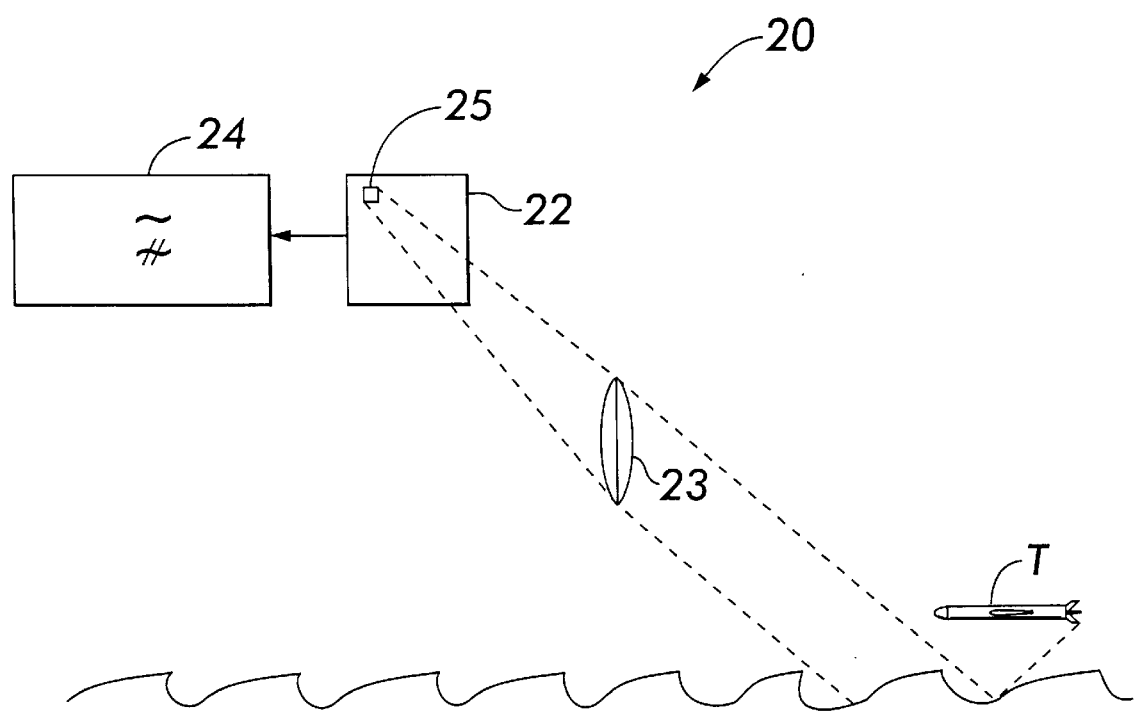
FIG. 1 is a block diagram of an infrared target detection system constructed in accordance with a preferred embodiment of the present invention.

In overview, the present invention embraces a novel method of infrared discrimination of a low-flying, fast-moving target in the presence of solar clutter on the ocean. Discerning a low-flying, fast-moving target directly is normally limited by spatial contrast and may require time-consuming summing. Also, the need to separate the target from clutter requires more expensive, higher-resolution systems. In accordance with the present invention, the target is detected indirectly by its reflections off the wave facets. Energy fluctuations of the water surface (i.e., solar clutter or glitter) is due to wave movement. A wave facet will move into and out of position to reflect energy into a pixel in about $\frac{1}{50}$th of a second, while a fast-moving target will be in position to reflect off an appropriately positioned wave facet into a pixel in a small fraction of that time (e.g., 0.5 $\mu$s). A detection system constructed in accordance with the present invention takes advantages of these principles to thereby enable the detection system of the present invention to be implemented without requiring expensive high-resolution or scanning (i.e., moving parts) components. Thus, the detection system of the present invention can be implemented at a lower cost and can achieve higher performance (e.g., increased ship survivability) than the presently available IR detection systems. Also, the detection system of the present invention is capable of detecting a low-flying, fast-moving target sooner than existing systems, due to a higher update rate, thereby rendering it more reliable than existing IR detection systems. Additionally, because the detection system of the present invention is a "staring" type IR detection system, rather than a "scanning" type IR detection system, it is more compact and lighter than existing systems. Moreover, the detection system of the present invention can not be easily countermeasured. It can either be employed as a stand-alone system or can be utilized as an adjunct to existing systems. In this regard, the detection system of the present invention can be easily integrated into existing electro-optical (EO) detection systems to thereby augment the capabilities and functionality thereof.

While the present invention is described herein with reference to illustrative embodiments for particular applications, it should be understood that the present invention is not limited thereto. Those having ordinary skill in the art and access to the teachings provided herein will recognize additional modifications, applications, and embodiments within the scope thereof and additional fields in which the present invention would be of significant utility.

In general, an infrared detection system in accordance with the present invention eliminates the problem of solar glitter on the ocean surface interfering with the detection of incoming targets by virtue of indirectly detecting a fast-moving target flying over the ocean by means of detecting the radiant (infrared) energy reflected from the target off of the rough ocean surface.

The detection system includes an array of infrared sensors or detector elements, each of which will hereinafter be referred to as a "pixel". The reflection of a high velocity target moves rapidly into and out of the field of view of a given pixel of the detection system, resulting in a pixel output signal component having a rapidly changing power level, i.e., the pixel has a rapidly changing power curve. Thus, the reflections of the high velocity target off of the ocean surface produces a high frequency pixel output pulse with a relatively short duration, e.g., having a duration of less than 1 µs. By contrast, the solar glitter produces a pixel output signal component having a relatively long duration, e.g., 20 ms. Thus, the target can be easily discriminated from the solar glitter by simple high-pass filtering of the pixel output signal.

In this connection, since this indirect detection scheme relies upon temporal frequency variations within the scene being viewed to detect the target, the spatial resolution requirements of the pixels can be somewhat relaxed. The only requirement is that the pixels have a sufficiently rapid response to target reflections. Moreover, it will be appreciated that the detection and target discrimination times of the indirect infrared detection system of the present invention are inversely related to the velocity (speed) of the target. Thus, the performance of the system actually improves as the speed of the target increases. Further, the lower the target flies to the surface of the water, the greater the amplitude (power) of the high frequency pixel output signal component produced by the target reflections. This is because the ocean surface becomes more reflective, at grazing angles, and there are less inverse square law losses. Thus, the lower the target flies over the water, the easier and faster it is to detect the target.

It can thus be appreciated that the infrared detection system of the present invention is ideally suited for rapid and reliable detection of low-flying, fast-moving targets over the water, even in the presence of solar clutter, and without the need for an expensive upgrade of the pixels or signal processing electronics, thereby overcoming the shortcomings of the presently available technology.

With reference now to FIG. 1, an infrared detection system 20 constructed in accordance with the present invention will now be described. More particularly, the infrared detection system 20 includes an infrared sensor or detector 22 which is mounted to a ship or vessel (not shown) in a manner well-known in the art. The height of the detector 22 is one of the system parameters that can be selectively varied. The detector 22 is preferably an array of individual infrared detectors or "pixels", one of which is designated as 25. For example, a square array of pixels, such as a 256×256, 512×512, or 1024×1024 pixel array, can be utilized. The system 20 also includes a lens 23 positioned in front of the detector 22 for focusing radiant energy onto the detector 22, and a high-pass filter 24 coupled to the output of the detector 22. The scientific theory and operation of the infrared detection system 20 is described in detail below.

In general, the infrared energy reflected by a target T which is flying above the water as it passes through the field of view of the detector 22 will produce a high-frequency power component at the output of the detector 22 which will pass through the high-pass filter 24, thereby enabling the target T to be easily and rapidly discriminated. In general, the detectability of the target increases with:

1) a decrease in range;
2) an increase in sensor height;
3) an increase in the field of view;
4) an increase in target speed;
5) an increase in target radiant intensity;
6) a decrease in the length of the sensor (pixel) array;
7) an increase in the lens aperture; and,
8) a decrease in target elevation.

Figure 2:
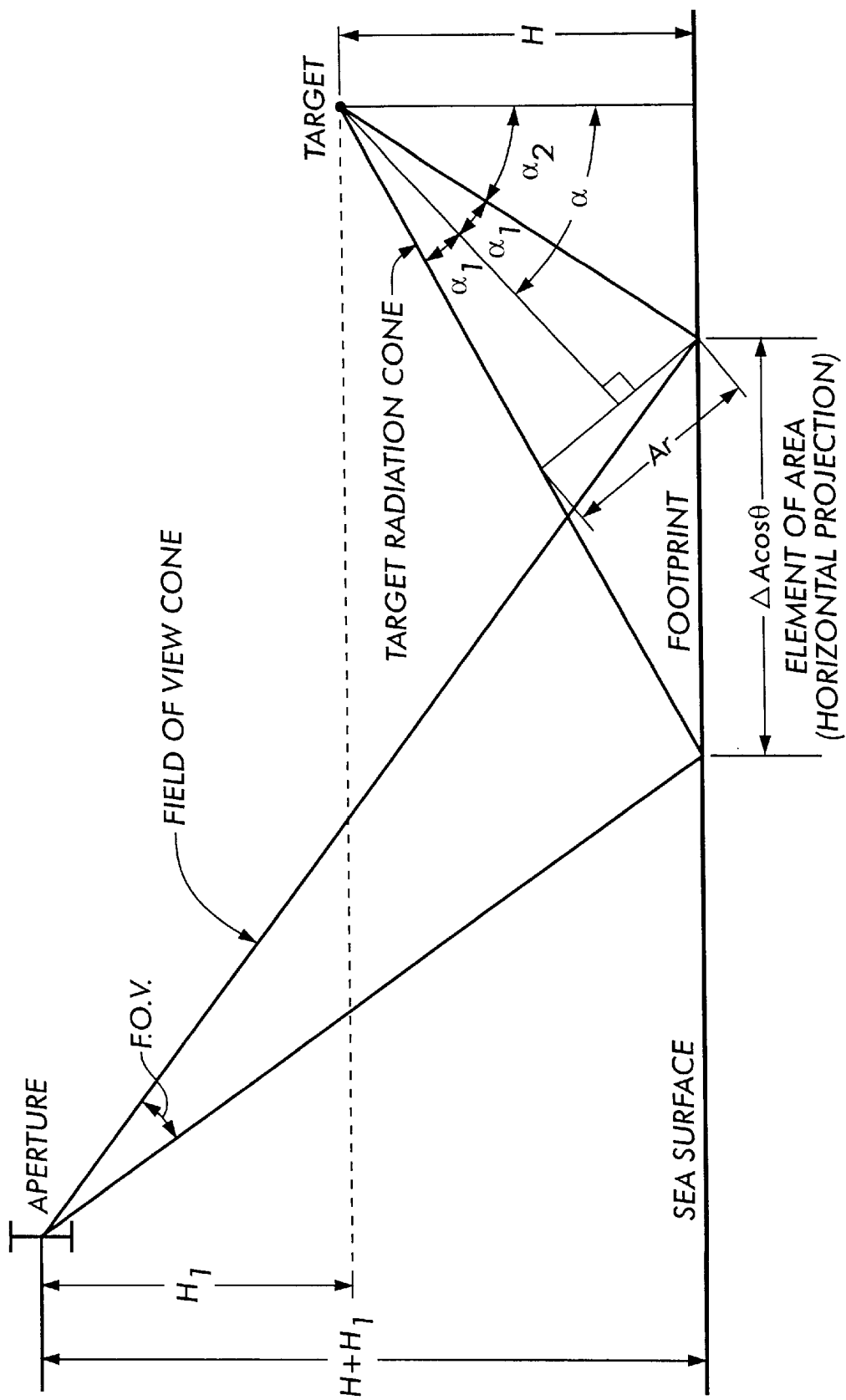
FIG. 2 is a schematic diagram of a target reflecting radiation off the sea into a pixel.
Figure 3:
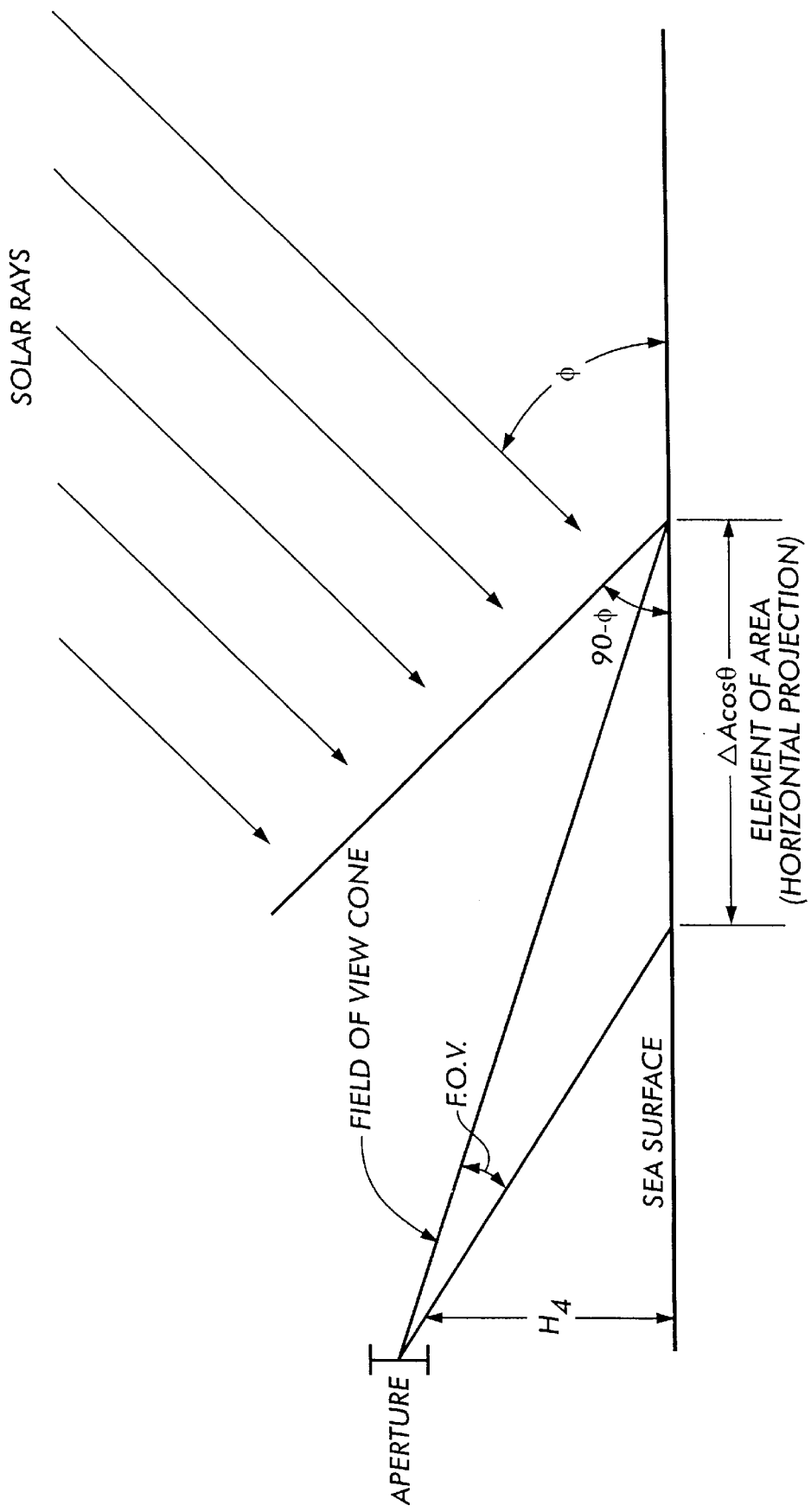
FIG. 3 is a schematic diagram of a solar reflection off a wave facet into a pixel.

With reference now to FIGS. 2 and 3, the theory of operation of the infrared detection system 20 of the present invention will now be described in detail. FIG. 2 is a schematic of a target reflecting off the sea into a pixel, and FIG. 3 is a schematic of a solar reflection off a wave facet into a pixel. The intersection of the field of view cone of a pixel and the ocean surface forms an elliptical curve called a "footprint". When the target T flies over the footprint at high speed, its reflection off a wave facet rapidly enters and exits the pixel's field of view with an ensuing rapid power change. In the time it takes a high-speed (e.g., Mach 1) target reflection to reflect off a wave facet, the wave positions have barely moved. Thus, the frequency of changes in the reflected solar power off a wave facet is very low relative to the frequency of changes in the reflected target power off the ocean surface. Thus, it is a quite straightforward matter to filter out the low frequency solar power using a conventional high-pass filter, thereby leaving only the high frequency reflected target power.

More specifically, the field of view cone has a vertex at the pixel with the angle between the axis of the cone and its surface equal to half the field of view of the pixel. If energy emitted from the target enters the footprint of a pixel, it will reflect into that pixel if it reflects off a wave facet, in the footprint, with the necessary orientation and position of the normal to the surface. A wave slope curve is the locus of points on equal wave slopes such that energy from the sun or the target reflected off these points enters a pixel. For a target in a fixed position, a wave facet with the necessary slope will be in the proper position to reflect energy from the target into a pixel if and only if the point of reflection lies on a wave slope curve for that slope. The principal parameters that can be varied in the computation of the reflected target and solar power are:

1) height of target;
2) height of detector;
3) solar elevation angle;
4) range and location of footprint;
5) range of target;
6) the number of pixels in the detector array;
7) wind speed;
8) field of view;
9) lens aperture; and,
10) length of the detector array.

The effect of the size of the lens aperture on the reflections from the ocean surface will now be briefly discussed. The vertical extent of a finite aperture subtends an area on a wave surface which is inclined at an angle θ with the horizontal, so that, given that the angle of incidence equals the angle of reflection, energy emitted from a stationary target or the sun at a given elevation will enter a particular pixel.

Figure 4:
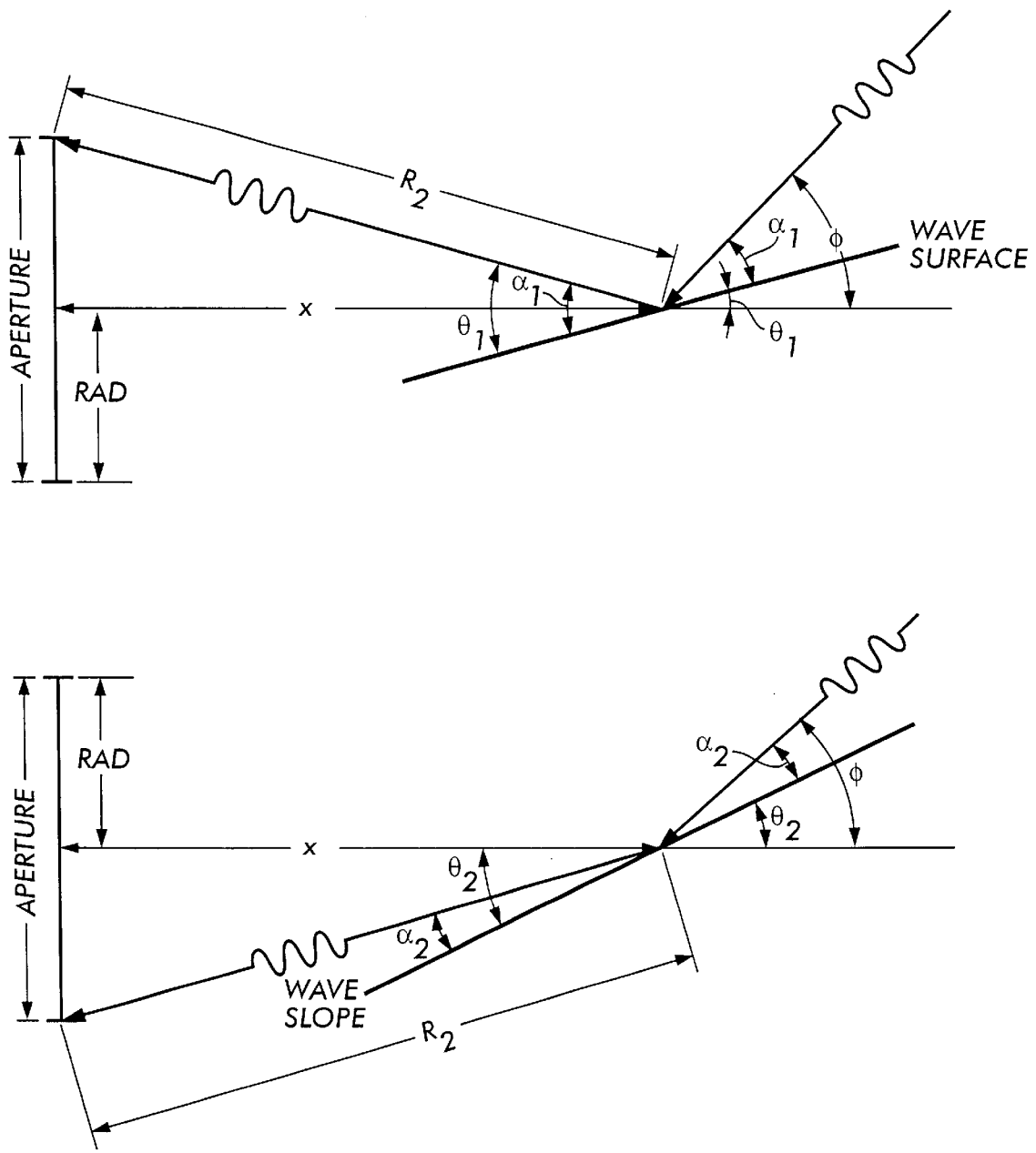
FIG. 4 is a schematic diagram which depicts the change in wave slope as a function of the angle subtended by the aperture of the detection system.

As can be seen in FIG. 4, light entering the top of the aperture has been reflected at an angle $\alpha_1$ off a wave surface tilted at an angle $\theta_1$ with the horizontal. Light with an angle of incidence and reflection equal to $\alpha_2$ reflected off a wave surface inclined at an angle $\theta_2$ with the horizontal will enter the bottom of the aperture. The difference between points with these two slopes on a wave surface (approximated by a sine wave) defines an area; if energy from an appropriately positioned target or the sun at a given elevation reflects from anywhere in this area, it will enter a pixel.

The angle subtended by the radius of the aperture at the wave surface for energy entering the top of the aperture is RAD/X=$(\alpha_1-\theta_1)$ radians, and the angle subtended by the radius for energy entering the bottom is RAD/X=$(\theta_2-\alpha_2)$ radians, where RAD is the radius of the aperture, and X is the horizontal distance from the aperture to a point on the wave surface. The total angle is 2RAD/X=$(\alpha_1-\theta_1)+(\theta_2-\alpha_2)$ radians. Since $\phi=\alpha_1+1=\alpha_2+\theta_2$, the above equation becomes, 2RAD/X=$\phi-2\theta_1+2\theta_2-\angle$. The difference between these two wave slope angles is:

$$\theta_2-\theta_1 = RAD/X \text{ radians.} \tag{1}$$

Figure 5:
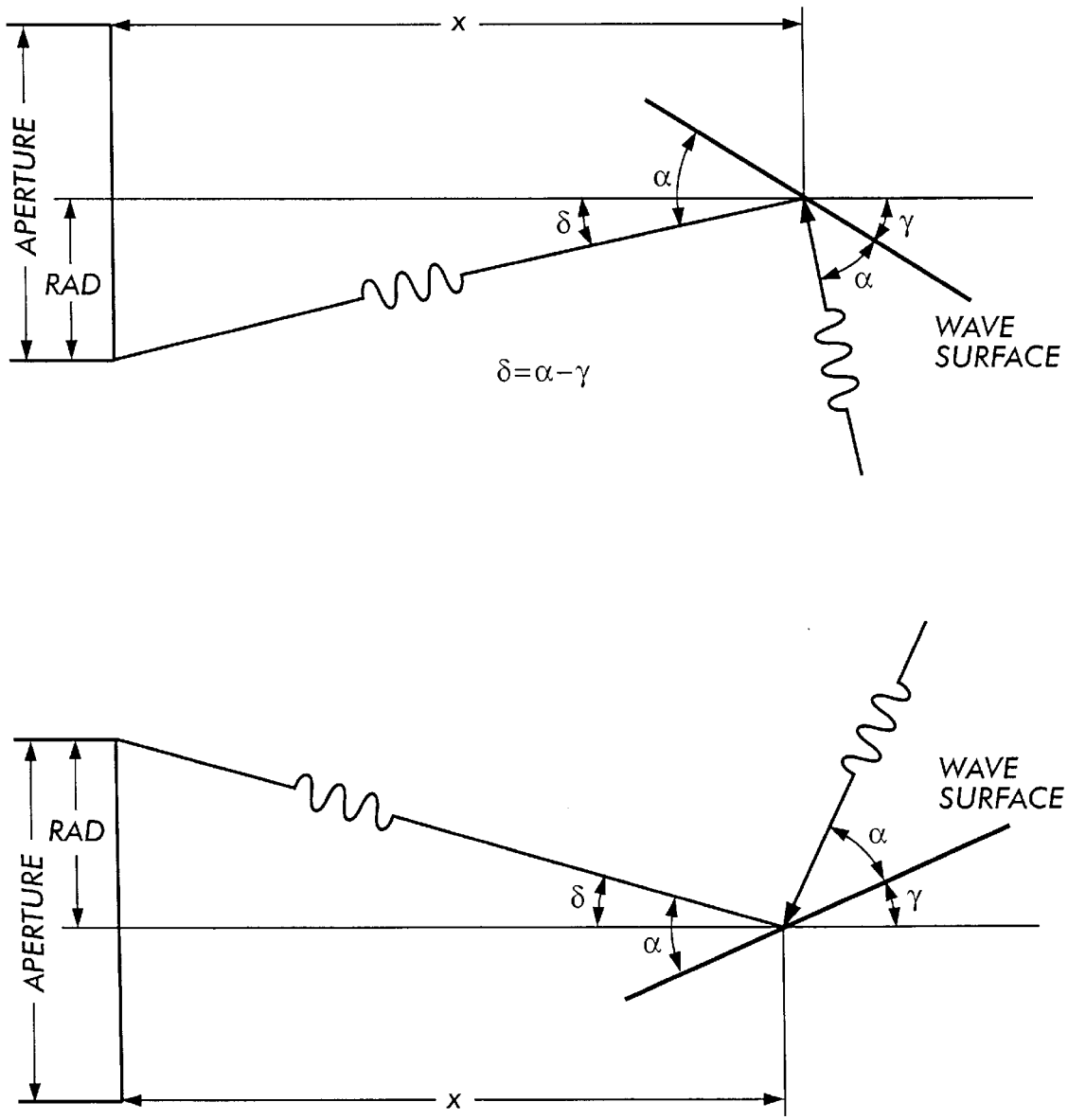
FIG. 5 is a schematic diagram which depicts the change in horizontal wave orientation as a function of the angle subtended by the aperture of the detection system.

The angle subtended by the horizontal extent of a finite aperture is derived in the same way, as is diagramatically depicted in FIG. 5. With reference to FIG. 5, this angle is:

$$2\delta = 2RAD/X \text{ radians.} \tag{2}$$

Figure 6:
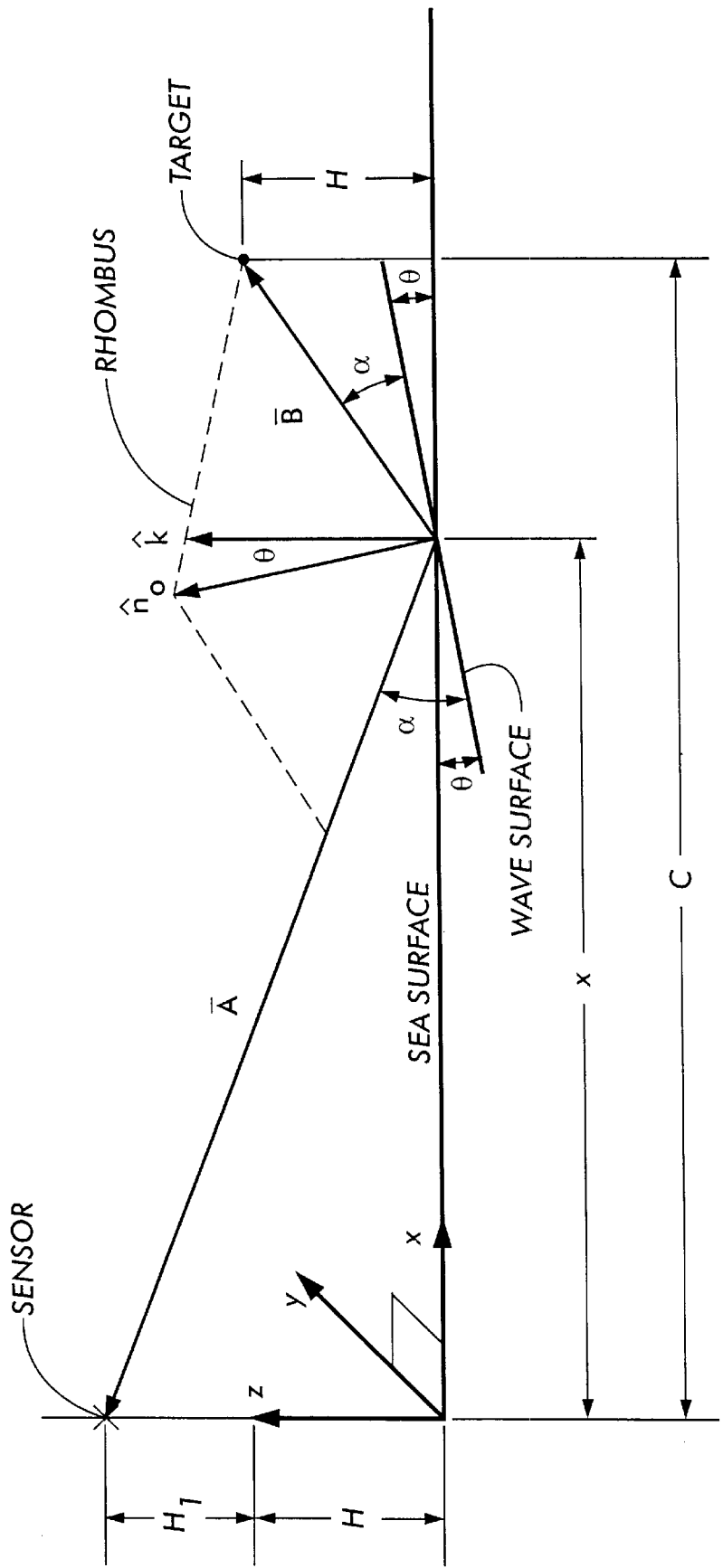
FIG. 6 is a diagram of the reflection of the target off a wave surface into a pixel.
Figure 7:
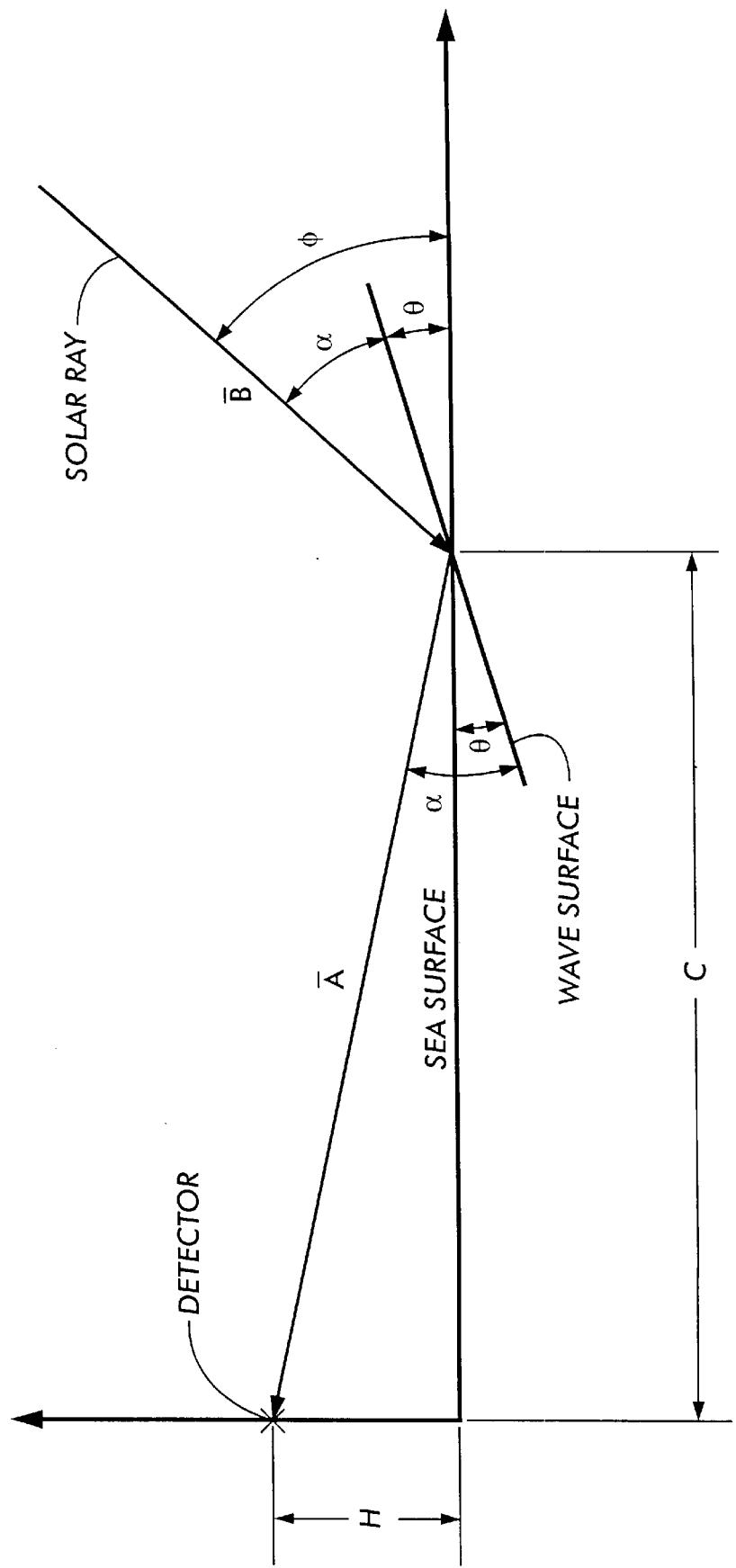
FIG. 7 is a diagram of the reflection of the sun off a wave surface into a pixel.

In the following discussion, it will be explained how the ocean surface reflects energy from a target as the target moves through the footprint, with reference to FIGS. 6 and 7. FIG. 6 is a diagram of the reflection of the target off a wave surface into the pixel and FIG. 7 is a similar diagram of the reflection of the sun off a wave surface into the pixel. The essential difference is that the missile (target) is close to the surface and is a point source radiating in all directions, while the sun is a source at "infinity" whose rays are parallel. $\overline{B}$ is a vector from the target to the point of reflection on the wave surface, $\overline{A}$ is the vector from the point of reflection on the wave surface to a pixel in the detector, $\hat{n}_0$ is the unit normal to the wave surface, $\hat{k}$ is the unit normal to the ocean surface, and C is the range of the target. The magnitudes of $\overline{A}\beta\overline{B}$ for the targets are:

$$|\overline{A}|=\sqrt{x^2+y^2+(H+H_1)^2}, \quad |\overline{B}|=\sqrt{(6-x)^2+y^2+H^2},$$

where H is the height of the target above the ocean and $H_1$ is the height of the detector above the target. For the sun, $\overline{B}=\hat{i}\cos\phi+\hat{j}\sin\phi$, where $\phi$ is the solar elevation angle. The unit vectors $\overline{A}/|\overline{A}|\beta\overline{B}/|\overline{B}|$, form the sides of a rhombus, as can be seen in FIG. 6. Their sum is a vector that lies along the diagonal, thus bisecting the angle between $\overline{A}$ and $\overline{B}$. Since the angle of incidence equals the angle of reflection, this diagonal vector is to the reflecting wave surface. Normalizing this vector yields $\hat{n}_0=$.

$$\left(\frac{\overline{A}}{|\overline{A}|}+\frac{\overline{B}}{|\overline{B}|}\right)*\left(\frac{|\overline{A}||\overline{B}|}{2(|\overline{A}||\overline{B}|)+(\overline{A}\cdot\overline{B})}\right)^{1/2}.$$

If a target is going to reflect into a pixel from a wave facet at an angle θ with the horizontal, it must lie on the curve $\hat{n}_0*\hat{k}=\cos\theta$. These parametric curves will be hereinafter referred to as wave slope curves.

Figure 8:
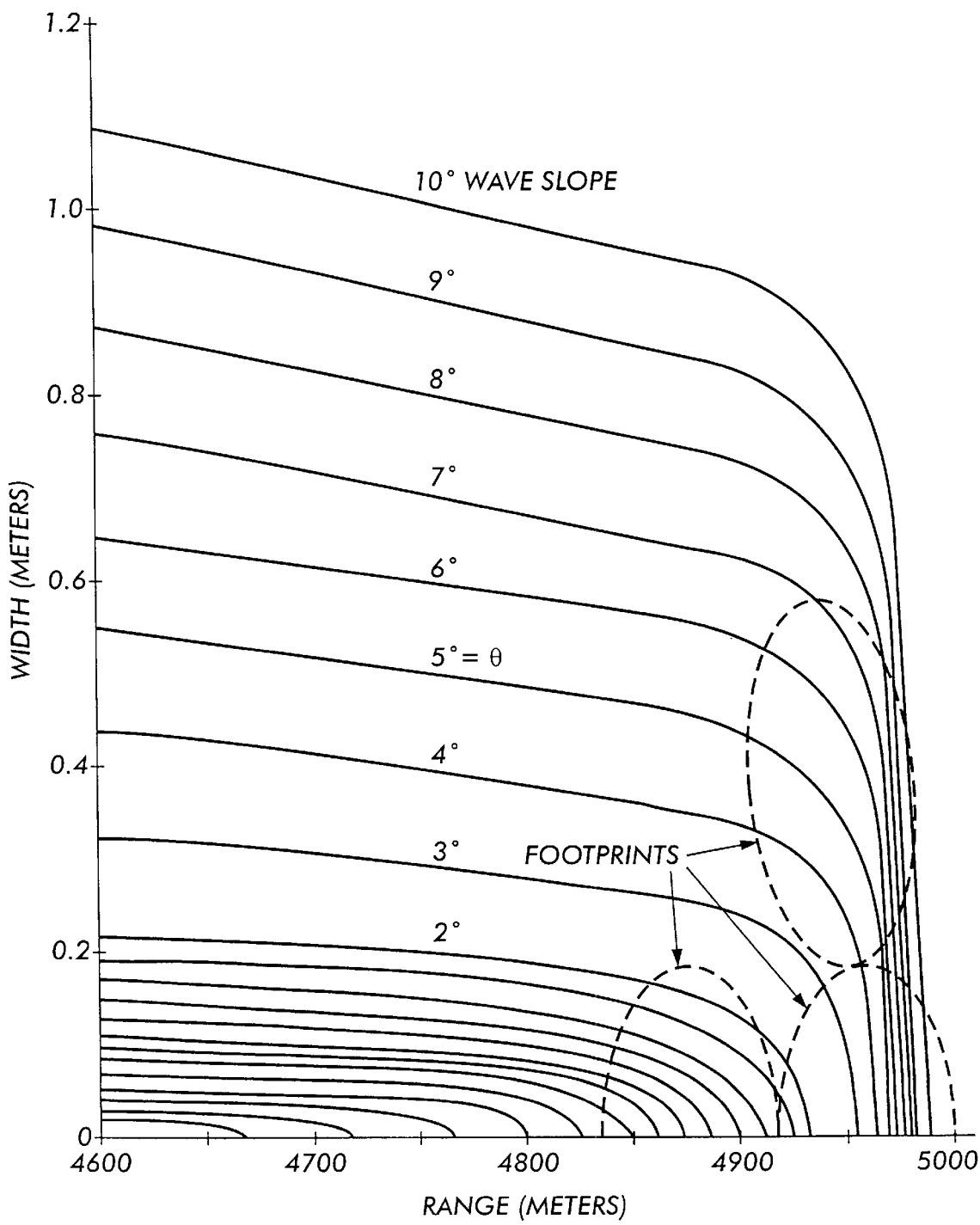
FIG. 8 is a diagram of various wave slope curves intersecting an elliptical footprint, creating elements of area.
Figure 9:
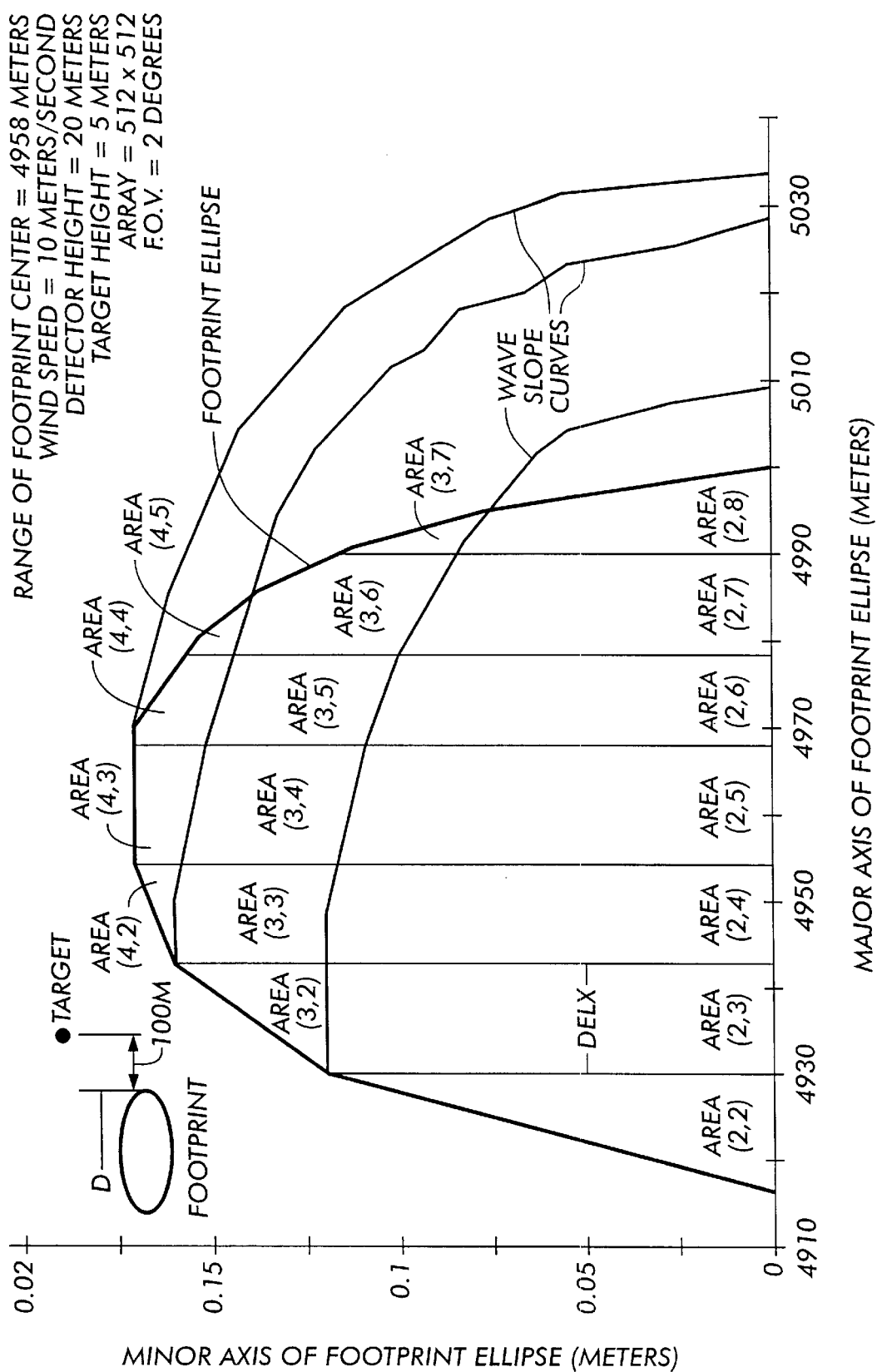
FIG. 9 is a diagram of the wave slope curves intersecting a first edge of the elliptical footprint for a target approaching the footprint at 100 meters.
Figure 10:
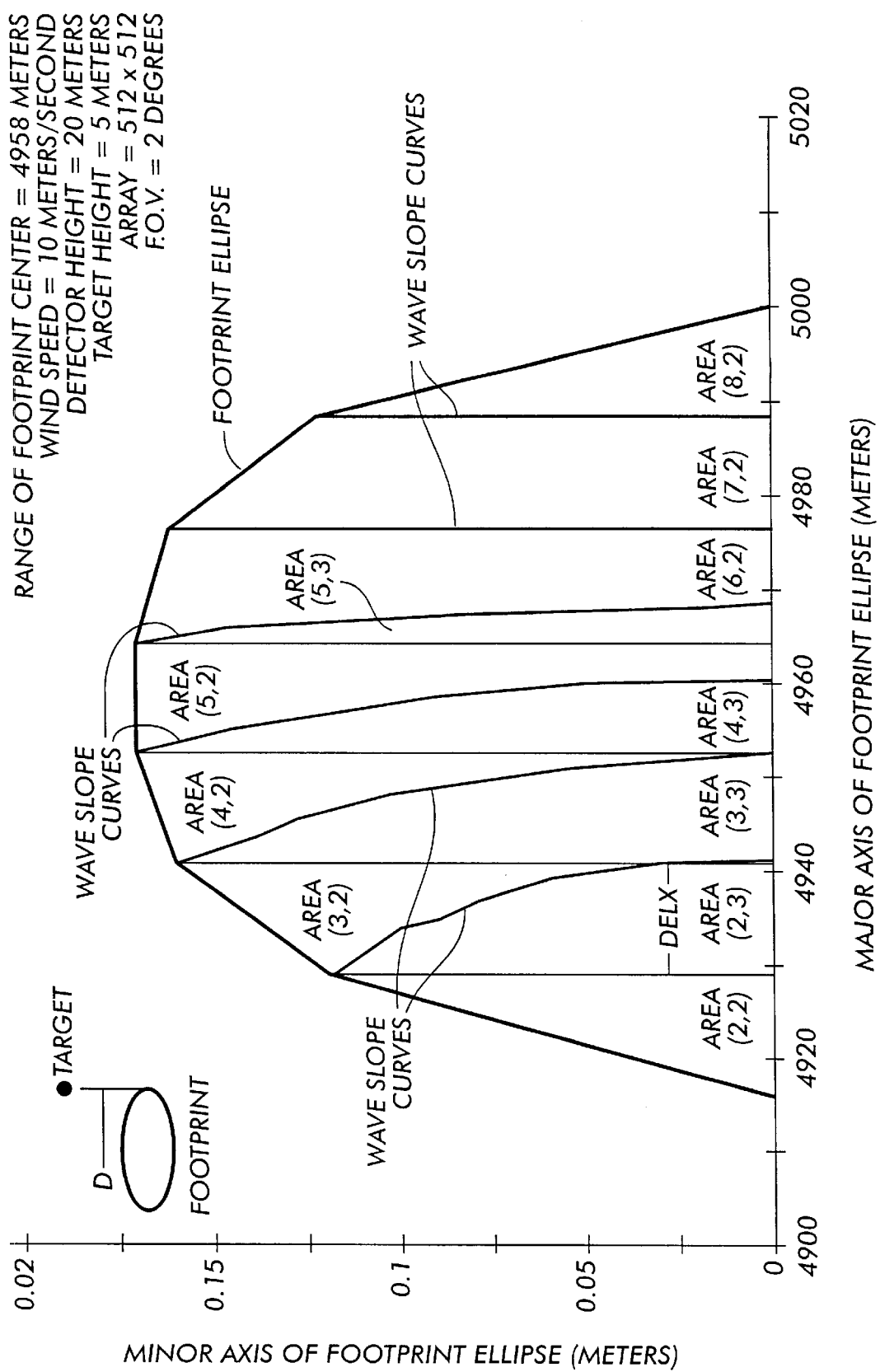
FIG. 10 is a diagram of the wave slope curves intersecting the elliptical footprint for a target at the far edge of the footprint.
Figure 11:
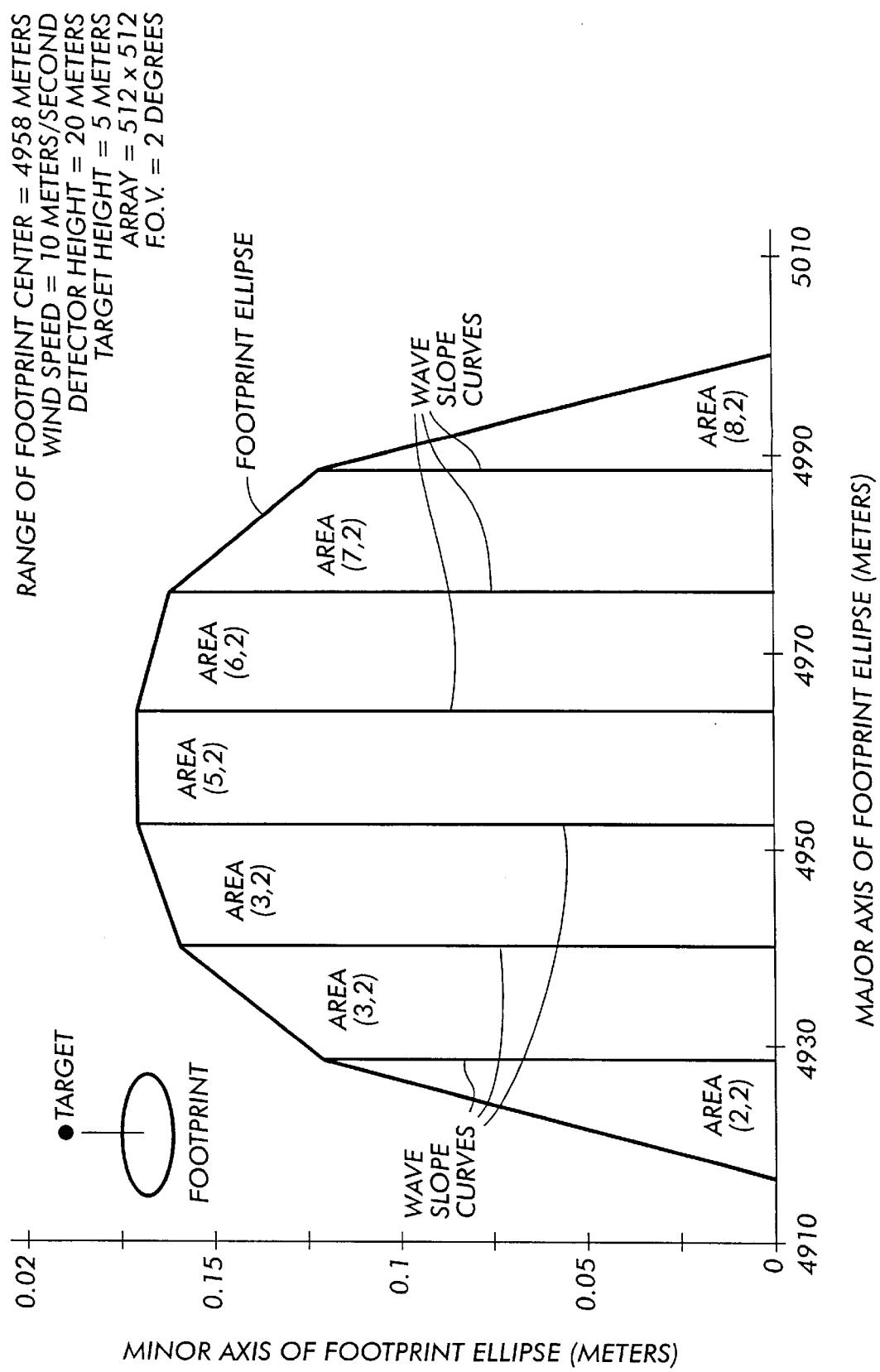
FIG. 11 is a diagram which illustrates the wave slope curves intersecting the elliptical footprint for a target in the center of the footprint.

Plots of the above-discussed curves intersecting three footprints are shown in FIG. 8 for a target at a range of 5 km with a wind speed of 10 m/sec. Details of the intersection of the wave slope curves with the footprint are shown in FIGS. 8, 9, and 10. As can be appreciated from FIGS. 8, 9, and 10, as the target moves to the left the wave slope curves move to the left with the target. When the target is outside of but moving toward the footprint, the horizontal sections of the wave slope curves intersect the footprint (FIG. 9), and as the target moves towards the center of the footprint, the position of the wave slope curves shift so that their vertical sections intersect the footprint (FIG. 11).

Figure 12:
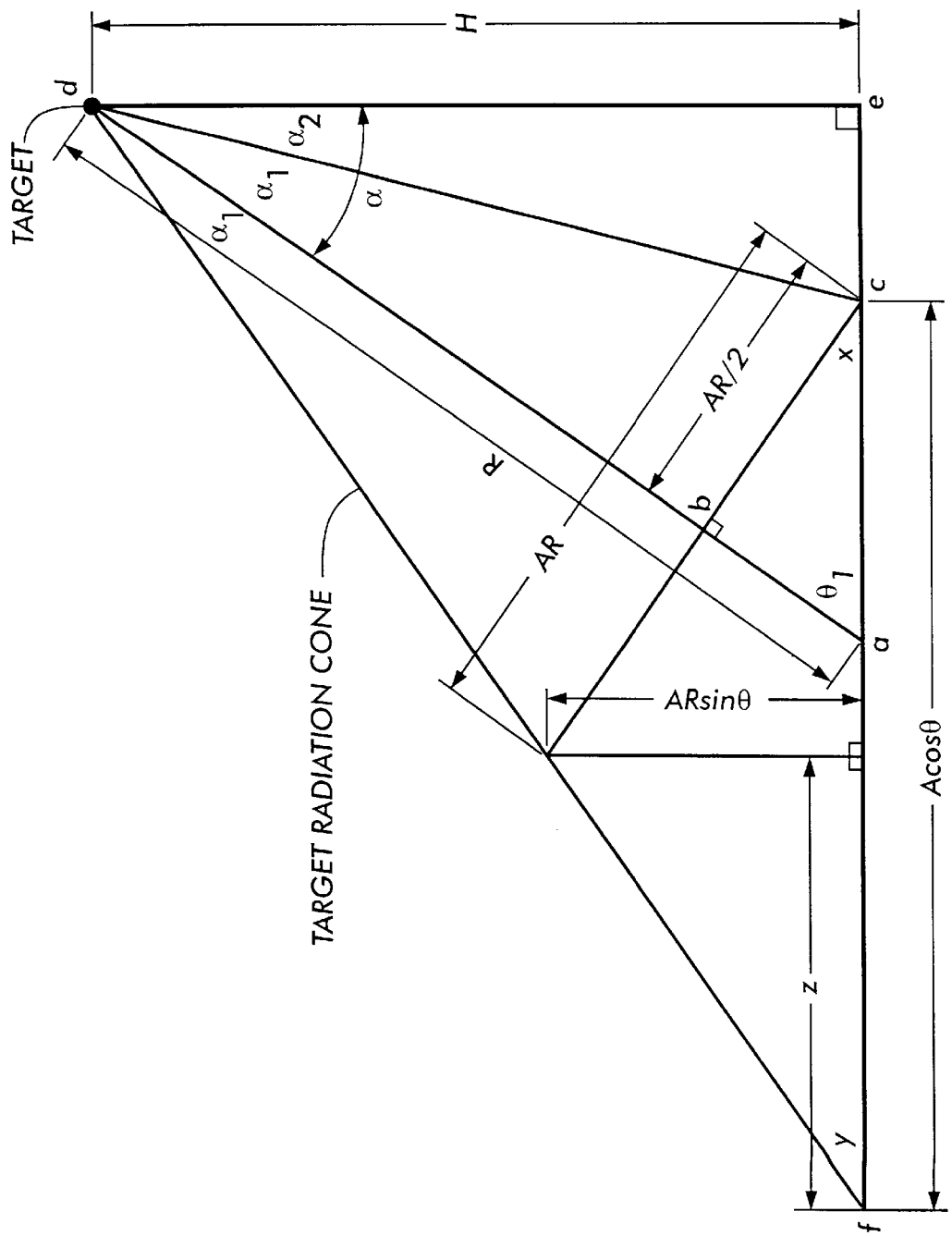
FIG. 12 is a diagram which depicts the projection of the element of area onto the base of the target radiation cone.

To calculate the steradians subtended by an element of area ΔA of wave surface on the target radiation cone, the cross-sectional area Ar of the cone at the ocean surface must be known. The horizontal projection ΔA is ΔA cos θ, where θ is the wave slope angle at the element of area. FIG. 12 is a diagrammatical depiction of this problem. As can be seen, energy is reflected off the rough sea and into the pixel. $\alpha_1$ is the angle between the axis of the target radiation cone and the surface of that cone, α is the angle between the vertical and the axis of the target radiation cone, and $\alpha_2$ is is the angle between the vertical and the surface of the target radiation cone. The target radiates a power of W watts/steradian. To derive Ar, angles X and Y must be found. Solving for angle X, adding the interior angles of triangle abc yields the following equation (3):

$$\theta_1+\alpha=90°, \tag{3}$$

and doing the same for triangle ade yields the following equation (4):

$$X+\theta_1=90°. \tag{4}$$

Solving equations (3) and (4) for X yields X=α. To solve for Y, the angles of triangle fde are added, so that Y=90−α−$\alpha_1$. The length of the element of area, ΔA cos θ, in terms of Ar, is represented by the following equation (5):

$$\Delta A \cos\theta = Ar * \cos\alpha + Z. \tag{5}$$

Knowing Y, Z can be calculated using the following equation (6):

$$Z = Ar * \sin\alpha/\tan Y. \tag{6}$$

Solving equations (5) and (6) for Ar produces the projection of the element of area onto the base of the target cone, i.e., Ar=ΔA cos θ/(cos α+(sin α/tan Y)). The projection number PROJAR=1(cos α+(sin α/tan Y)). The distance between the target and ΔA is R=H/cos α. The projection of ΔA at the target PROJ=PROJAR/R² steradians. Multiplying W by PROJ yields the total power from the target impinging on an element of area ΔA. The power (WATTS) reflected from an element of area ΔA that reaches the pixel is represented by the following equation (7):

$$WATTS = W * \Delta A \cos\theta * PROJAR/R^2. \tag{7}$$

The sun's rays are parallel becuase they are emitted from an "infinite" source. They enter the footprint at an angle φ and a small percentage are scattered into a pixel. FIG. 7 is a diagram of the problem. The solar constant at sea level in the 3 to 5 micron band is W=7.42 watts/m² at the surface, for a solar elevation of 40°. W was obtained by multiplying the integral of the exoatmospheric black body radiation curve in the 3 to 5 micron band (22.79 watts/m²) by the atmospheric absorption curve in the same band (computed on LOWTRAN).

Since the sun's rams are parallel, projection of the solar energy onto an element of area in the footprint is PROJ=cos $(90-\phi)$. The total power emitted by the sun into the element of area is W * ΔA * PROJ. The sunlight reflected by the element of area into the pixel is defined by the following equation (8):

$$\text{WATTS} = W * \Delta A * \cos(90-\phi). \quad (8)$$

Figure 13:
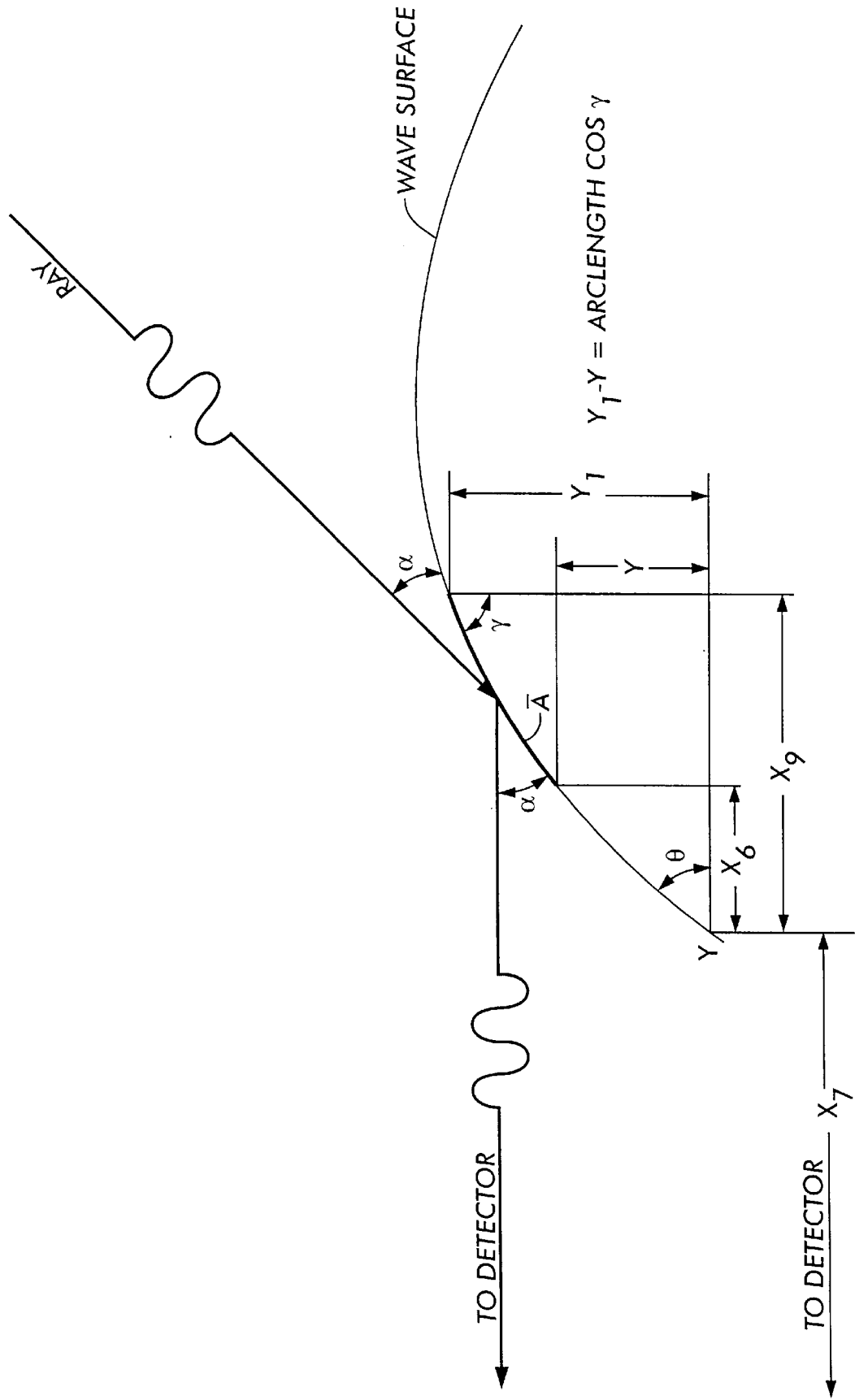
FIG. 13 is a diagram which depicts the cross-section of a wave reflecting a ray into a pixel, showing the arc length forming the side of the element of area, $\Delta A$.
Figure 14:
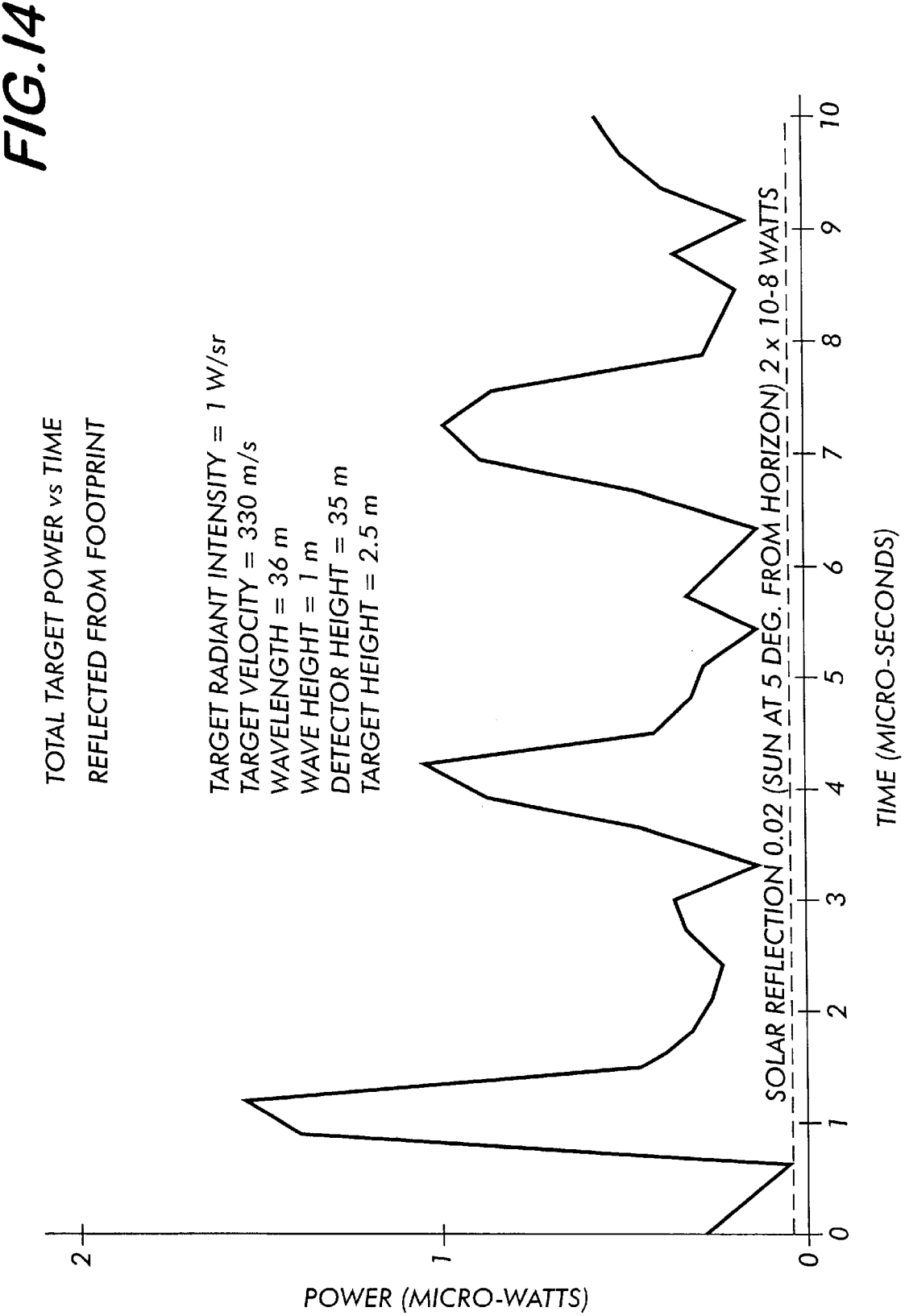
FIG. 14 is a diagram which depicts the target power reflected from the footprint versus time; and, FIG. 15 is a diagram which depicts the reflected target power versus time, showing a detail of the first peak.
Figure 15:
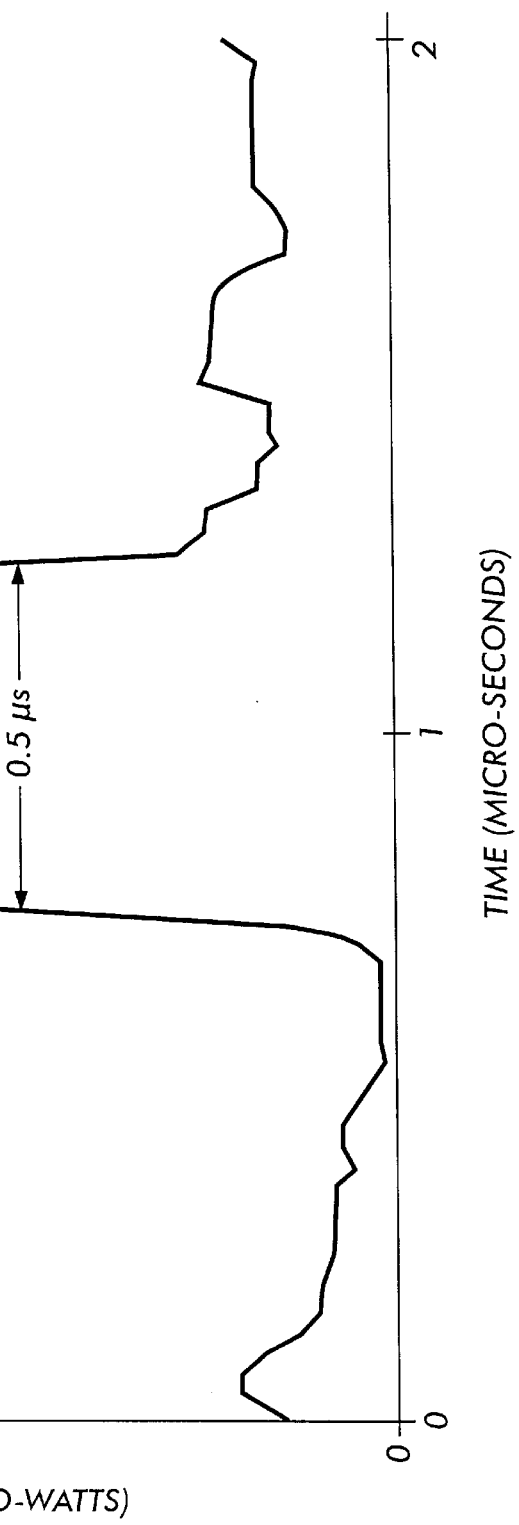

The aforedescribed mathematical tools are used to determine the reflected energy of the missile (target) and the sun off the wave facet. The wave slope curves in FIG. 8 show that a target at a fixed point can reflect off many surfaces within a footprint, so that more than one wave can contribute to a reflected pulse. FIG. 4 shows the effect of aperture on the reflection off a wave facet. When a target is in position to reflect into a pixel, it will initially reflect into the top of the lens from one point of the wave surface at an angle of $\theta_1$, and into the bottom from a point of the wave surface at a steeper angle, $\theta_2$, further down the wave. These two points define an arc length on the wave facet, as can be seen in FIG. 13. This arc length multiplied by the width of the footprint form the element of area, ΔA. When ΔA has been determined, equation (7) can be used to calculate the power in watts reflected off a wave facet. FIG. 14 shows the total power versus time of a one watt target traveling at Mach 1 reflected from a footprint at 20,000 meters. FIG. 15 is a detail of the first pulse. The pulse widths are in the neighborhood of 0.5 μs. The solar reflection as a function of time is shown by the dotted line for a solar elevation of 5° above the horizon. The main point that is illustrated is that the solar glitter is DC, compared to the target (missile) pulses. Thus, the solar glitter can be easily filtered out by a high-pass filter, leaving only the reflected target (missile) pulses.

Although the present invention has been described in detail hereinabove, it should be clearly understood that many other alternative embodiments, variations and/or modifications of the basic inventive concepts taught herein which may appear to those skilled in the pertinent art will still fall within the spirit and scope of the present invention as defined in the appended claims.

What is claimed is:

1. A detection system for detecting a target flying over water, comprising:
    a detector positioned to receive radiation reflected by the target off the water, and producing a detector output signal having an amplitude proportional to the amount of received radiation;
    a high-pass filter for passing portions of the detector output signal having a frequency greater than a prescribed threshold frequency, and for blocking portions of the detector output signal having a frequency lower than the prescribed threshold frequency; and, wherein the prescribed threshold frequency is sufficiently high to ensure that only the portions of the detector output signal produced by the radiation reflected by the target off the water are passed by the high-pass filter, and that portions of the detector output signal produced by solar glitter are not passed.

2. The detection system as set forth in claim 1, wherein the detector comprises a plurality of infrared detectors.

3. The detection system as set forth in claim 2, wherein the plurality of infrared detectors comprises a two-dimensional array of infrared detectors.

4. The detection system as set forth in claim 3, wherein the array is a square array.

5. The detection system as set forth in claim 1, wherein the detector is mounted to a ship.

6. The detection system as set forth in claim 5, wherein the detector is mounted to the ship at a prescribed height relative the water.

7. The detection system as set forth in claim 1, further comprising a lens positioned in front of the detector for focusing the radiation reflected by the target off the water onto the detector.

8. The detection system as set forth in claim 1, wherein target is a high-velocity target.

9. The detection system as set forth in claim 1, wherein the target is a low-flying, fast-moving target.

10. The detection system as set forth in claim 9, wherein the target is a cruise missile.

11. A detection system for detecting a target flying over water, comprising:
    detector means for receiving radiation reflected by the target off the water, and producing a detector output signal having an amplitude proportional to the amount of received radiation;
    means for passing only portions of the detector output signal having a frequency greater than a prescribed threshold frequency; and,
    wherein the prescribed threshold frequency is sufficiently high to ensure that only the portions of the detector output signal produced by the radiation reflected by the target off the water are passed, and that portions of the detector output signal produced by solar glitter are not passed.

12. The detection system as set forth in claim 11, wherein the detector comprises a plurality of infrared detectors.

13. The detection system as set forth in claim 12, further comprising means for focusing the radiation reflected by the target off the water onto the detector.

14. The detection system as set forth in claim 13, wherein the target is a low-flying, fast-moving target.

15. The detection system as set forth in claim 14, wherein the system is installed on a ship.

16. A method for detecting a target flying over water, comprising the steps of:
    receiving radiation reflected by the target off the water, and producing an output signal having an amplitude proportional to the amount of received radiation;
    passing only portions of the detector output signal having a frequency greater than a prescribed threshold frequency; and,
    wherein the prescribed threshold frequency is sufficiently high to ensure that only the portions of the output signal produced by the radiation reflected by the target off the water are passed, and that portions of the detector output signal produced by solar glitter are not passed.

17. The method as set forth in claim 16, wherein the radiation comprises infrared radiation.

18. The method as set forth in claim 16, wherein the target is a low-flying, fast-moving target.

19. The method as set forth in claim 18, wherein the target is a cruise missile.

20. The method as set forth in claim 16, wherein the first-recited step is performed using an array of infrared sensors.

* * * * *